Oct. 29, 1963    C. D. MULLINIX    3,108,770
BRIDLE CONSTRUCTION FOR ROTATABLE KITE
Filed April 27, 1962
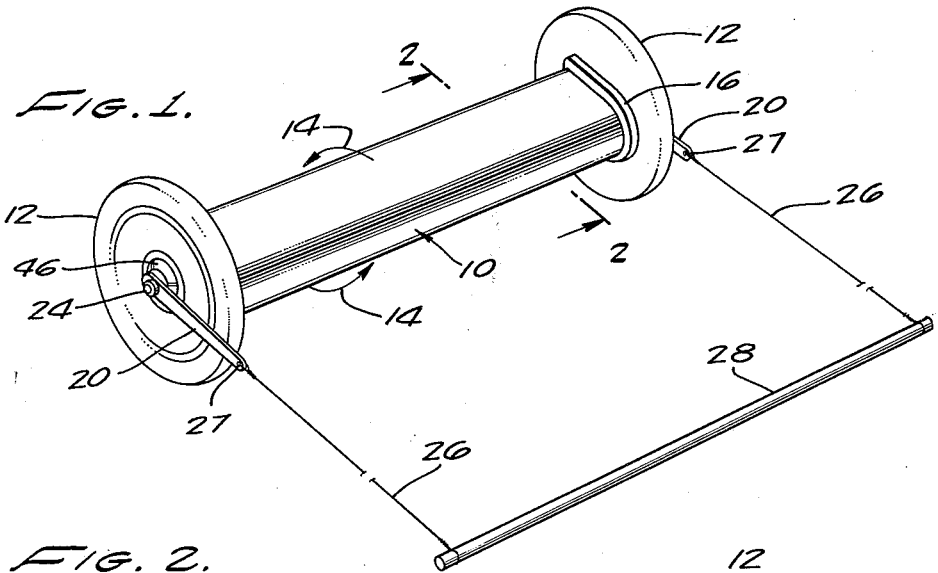
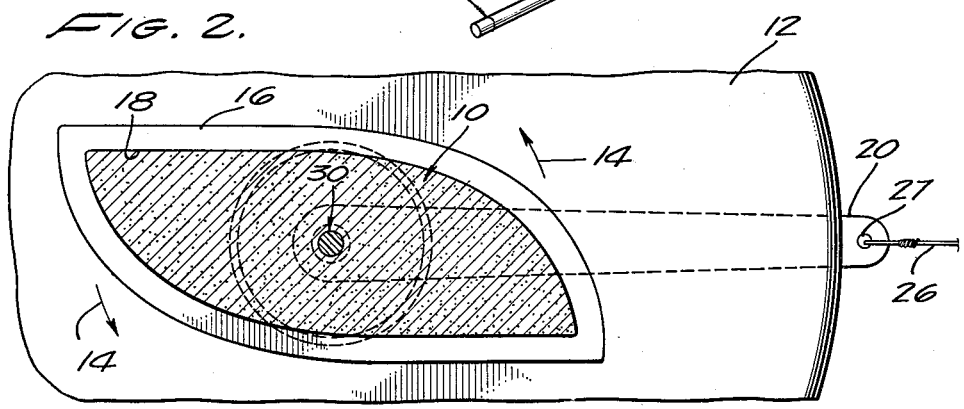
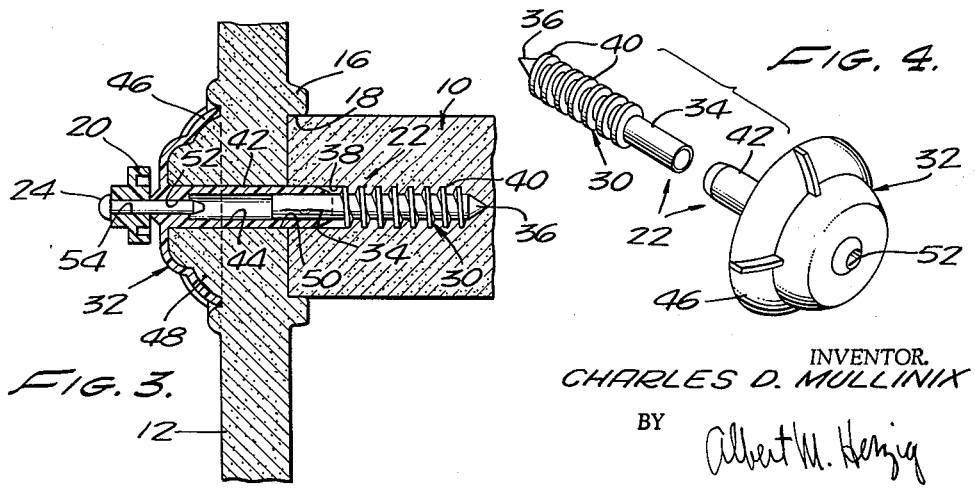
INVENTOR.
CHARLES D. MULLINIX
BY Albert M. Herzig
ATTORNEY

United States Patent Office 3,108,770
Patented Oct. 29, 1963

3,108,770
BRIDLE CONSTRUCTION FOR
ROTATABLE KITE
Charles D. Mullinix, 2433 Via Campesina,
Palos Verdes Estates, Calif.
Filed Apr. 27, 1962, Ser. No. 190,673
7 Claims. (Cl. 244—153)

This invention relates to kites of the rotary wing or airfoil type and more especially to bridles for holding and guiding the airfoil during flight and providing bearings for rotation thereof.

Rotary wing or rotatable airfoil kits have recently been developed and are widely used. The aerodynamic characteristics and general mode of operation thereof are well known in the art. In general these kites comprise a generally elongated airfoil which is rotatable about its longitudinal axis and has a disc attached to each end which is somewhat larger in diameter than the width of the airfoil itself. The airfoil and the discs are preferably made of a very light material such as balsa wood, however, Styrafoam is a common material used for their manufacture. In order for the airfoil to rotate suitable bearing means must be provided together with bridle assemblies for securing the ends of the two cords which permit rotation of the kite and guidance thereof in manoeuvring it while in the air.

The present invention is directed primarily to the bridle and/or control means for such kites and find its fruition in a simplified and effective assembly mounted at the ends of the kite having an improved and simplified structure and mode of attachment for the cords or strings to the bridle for control of the airfoil while in the air.

It is therefore the general purpose and objective of this invention to provide a novel, improved and easily fabricated and produced bridle assembly and one which is fully effective and efficient for its intended purpose.

The invention as set forth in this specification is exemplified in a rotary wing or rotatable airfoil kite wherein the airfoil and the disc are preferably made of Styrafoam or other very light material. The wing is formed with end bores and the end discs are each similarly bored to receive a dowel pin and bearing assembly which mounts the airfoil in a rotatable relationship thereto and at the same time provides means for attaching the control cords or lines thereto which are used in holding and guiding as well as maneuvering the kite while in flight. These dowel pins are preferably made in two parts and are detachably secured together in a novel manner permitting the relatively permanent securement of one part in the end bore of the airfoil while making it possible for the other part to be detached therefrom or detachably secured thereto for disassembly of the parts, and particularly the discs, for storage and during shipment.

These bearing and bridle assemblies are also preferably of very light material, such as plastic, and have openings by which the several parts may be secured together as mentioned. In a preferred form of the invention the dowel pin part which is inserted in the airfoil is secured in the bore therein by screw thread securement which is very strong and can be made in a very simple and effective manner. In summary the assembly effectively and economically provides a novel rotary mounting of an airfoil kite and for securing it to the guiding cords or strings.

Further objects of the invention are found in the particular construction and arrangements of the parts whereby the aforesaid objects are realized.

Other objects and advantages of the invention will appear and be brought out more fully in the following specification, reference being had to the accompanying drawings, wherein;

FIGURE 1 is a perspective view of an airfoil or rotary wing kite incorporating the bridle of the present invention therein.

FIGURE 2 is a sectional view, enlarged, taken along line 2—2 of FIG. 1.

FIGURE 3 is a detail view in section of the improved bridle means of this invention.

FIGURE 4 is a perspective view of the dowel pin and bearing assembly shown in FIGURE 3.

As outlined above, the aerodynamic characteristics and the general nature of rotary wing or airfoil kites are well known in the art. The present invention will therefore be described in detail together with the general description of a typical form of rotary wing kite. FIGURE 1 shows a typical kite as it would appear in flight and comprises an airfoil 10 preferably constituted of a very lightweight material such as Styrafoam and having a cross-section shape as shown in FIGURE 2. This cross-section shape is a preferred form, however other forms may be employed if desired. A pair of discs 12 are secured at the ends of the airfoil in a manner to be more fully described hereinafter.

The airfoil when in flight rotates in a direction as indicated by the arrows 14, the discs 12 serving to assist in stabilizing the kite while airborne.

Another configuration for the kite is shown in Patent No. 2,501,442 and may be used in connection with the present invention if desired.

One side of each disc 12 is formed with a boss 16, of the general shape of the cross-section of the airfoil and provides a recess 18 in which the ends of the airfoil may be placed so as to ensure rotation of the discs simultaneously with the airfoil. The exterior surface of the airfoil and the discs is preferably smooth.

The bridle of this invention is shown more particularly in FIGURES 3 and 4 and comprises a link arm 20, a two-part dowel pin generally designated at 22 and a bearing pin 24. Cords 26 are suitably secured, as being passed through apertures 27, in the ends of link arms 20 and tied thereto and have their other ends secured to a maneuvering or guiding rod or stick 28.

Each dowel pin 22 has a part 30 and a part 32 slidably and detachably secured to part 30 thereof. Dowel pin part 30 has a shank 34 and a pointed or sharpened end 36 to facilitate insertion of this part in one of the end bores 38 of the airfoil 10. This part also has threads 40 by which this part may be screwed into the bore 38 and to provide a secure and firm attachment of this part in the end of the airfoil.

Dowel pin part 32 has a cylindrical body 42 and an end bore 44 in which is received shank 34 of part 30 with a slidable but firm fit. Part 32 also has a bell-shaped flange or skirt 46 which fits over a somewhat conical shaped boss 48 extending from the side of each disc 12, the discs having transverse holes 50 therein through which the body portion 42 of part 32 extends. Part 32 is also formed with an end bore 52 in which bearing pin 24 is received with a firm however slidable fit. Link arms 20 each have a transverse bore 54 through which the associated bearing pin 24 extends.

The mode and manner of assembly of the airfoil and bridle of this invention are as follows. Airfoil 10 and discs 12 as stated above, are preferably formed of Styrafoam. The parts of the dowel pin 22 are preferably made of a suitable thermoplastic. When assembling the kite each dowel pin part 30 is inserted in one of the end bores 38 of the airfoil 10 by a self-tapping screw action whereby this part will be firmly seated in the bore. Part 32 and one of the discs 12 are assembled by insertion of body 42 of the part 32 through disc hole 50 and skirt 46 pressed on boss 48 of the disc. Part 32 is then joined to part 30 by pressing cylindrical body 42 on shank 34 so as to have a firm although slidable fit therewith. Each link arm 20 is then assembled to dowel pin part 32 by the insertion of bearing pin 24 first through bore 54 of a link arm and then into bore 52 of the part 32. Cords 26 and guiding rod or stick 28 are then assembled in an obvious manner.

The dowel pin part 30 at the left side of the kite (FIG. 1) is a right hand thread, while the dowel pin part at the opposite end of the kite is a left-hand or reverse thread. This is so that when the airfoil 10 rotates as shown by arrows 14, the parts 30 will tend to tighten rather than unscrew into the bores 38.

In commercial production of the kite, expandible polystyrene provides certain advantages over Styrafoam. The two materials have quite similar characteristics such as light weight, but expandible polystyrene is readily moldable whereas the Styrafoam ordinarily must be machined, i.e. carved or turned. Since devices such as this kite many normally be more quickly, readily and economically produced by molding than by machining, the expandible polystyrene will often be the preferred material.

The foregoing disclosure in respresentative of a preferred form of the invention and is to be interpreted in an illustrative rather than a limiting sense, the invention to be accorded the full scope of the claims appended hereto.

What is claimed is:

1. In a rotatable airfoil kite of the type comprising an airfoil rotatable about its longitudinal axis and having end discs, the improvements comprising bosses on opposite sides of said discs, one of said bosses forming a recess to receive an end of said airfoil, bridle members having bearing pin bores, and two-part dowel pins each having a part secured in one end of said airfoil and a second part detachable therefrom and having a skirt overlying the other boss of one of said discs.

2. In a rotatable airfoil kite a bridle comprising a pair of link arms adapted to extend transversely from the airfoil each having a bearing bore adjacent one end thereof, a dowel pin extending into one end of said airfoil and a bearing pin for said link arm and dowel pin.

3. A bridle for a rotatable airfoil kite comprising a pair of link arms adapted to extend transversely therefrom each having a transverse bearing bore adjacent one end thereof, a two-part dowel pin having a part insertable into one end of said airfoil and a part detachable therefrom, and a bearing pin for said link arm and dowel pin.

4. A bridle for a rotatable airfoil kite comprising a pair of link arms adapted to extend transversely therefrom each having a transverse bearing bore adjacent one end thereof, a two-part dowel pin having a part insertable into one end of said airfoil and a part slidably detachable therefrom, one of said parts having a bearing pin bore, and a bearing pin in said bore.

5. A bridle for a rotatable airfoil kite having a pair of end discs comprising a pair of link arms adapted to extend transversely of the airfoil axis each having a transverse bearing bore adjacent one end thereof, a pair of dowel pins each insertable through one of said discs and into one end of said airfoil, said dowel pins each having a bearing pin bore, and a bearing pin for each said bores.

6. A bridle for a rotatable airfoil kite comprising a pair of link arms adapted to extend transversely therefrom each having a transverse bearing bore adjacent one end thereof, a telescoping two-part dowel pin having a part secured in one end of said airfoil and a second part slidably detachable therefrom, one of said parts having a bearing pin bore, and bearing pins for said bores.

7. A bridle for a rotatable airfoil kite comprising a pair of link arms adapted to extend transversely therefrom each having a transverse bearing bore adjacent one end thereof, a telescoping two-part dowel pin having a self-tapping screw part insertable into one end of said airfoil and a second part slidably detachable from the first part and having a bearing pin bore, and a bearing pin for said bearing pin and link arm bores.

References Cited in the file of this patent

UNITED STATES PATENTS

| | | |
|---|---|---|
| 2,494,430 | Carnwath | Jan. 10, 1950 |
| 2,501,442 | Donaldson | Mar. 21, 1950 |
| 2,768,803 | Smith | Oct. 30, 1956 |
| 2,801,063 | O'Gorman | July 30, 1957 |
| 3,022,966 | Briggs | Feb. 27, 1962 |
| 3,026,073 | Albertson | Mar. 20, 1962 |